United States Patent
Angel, Jr. et al.

(10) Patent No.: US 9,652,532 B2
(45) Date of Patent: May 16, 2017

(54) METHODS FOR OPERATING AUDIO SPEAKER SYSTEMS

(71) Applicant: SR Homedics, LLC, Commerce Township, MI (US)

(72) Inventors: Donald Earl Angel, Jr., Foster City, CA (US); Brian Carskadon, Wilsonville, OR (US)

(73) Assignee: SR Homedics, LLC, Commerce Township, MI (US)

( * ) Notice: Subject to any disclaimer, the term of this patent is extended or adjusted under 35 U.S.C. 154(b) by 43 days.

(21) Appl. No.: 14/616,499

(22) Filed: Feb. 6, 2015

(65) Prior Publication Data
US 2015/0222987 A1 Aug. 6, 2015

Related U.S. Application Data

(60) Provisional application No. 61/936,818, filed on Feb. 6, 2014.

(51) Int. Cl.
*H04B 3/00* (2006.01)
*G06F 17/30* (2006.01)

(52) U.S. Cl.
CPC ............................. *G06F 17/30772* (2013.01)

(58) Field of Classification Search
CPC .............................................. G06F 17/30772
See application file for complete search history.

(56) References Cited

U.S. PATENT DOCUMENTS

| | | |
|---|---|---|
| 7,089,176 B2 | 8/2006 | Boillot et al. |
| 7,742,746 B2 | 6/2010 | Xiang et al. |
| 7,817,960 B2 | 10/2010 | Tan et al. |
| 7,904,028 B2 | 3/2011 | Tan |
| 7,908,442 B2 | 3/2011 | Tan |
| 7,949,300 B2 | 5/2011 | Tan et al. |
| 8,082,051 B2 | 12/2011 | Mihelich et al. |
| 8,315,876 B2 | 11/2012 | Reuss |
| 8,321,449 B2 | 11/2012 | Tan |
| 8,442,428 B2 | 5/2013 | Tan et al. |
| 8,538,042 B2 | 9/2013 | Yang et al. |
| 8,559,655 B2 | 10/2013 | Mihelich et al. |
| 2004/0242278 A1 | 12/2004 | Tomoda et al. |
| 2008/0177751 A1 | 7/2008 | Tan |
| 2008/0177765 A1 | 7/2008 | Tan |
| 2008/0177780 A1 | 7/2008 | Tan |
| 2010/0029196 A1 | 2/2010 | Tan |
| 2011/0166961 A1 | 7/2011 | Tan et al. |
| 2012/0275618 A1 | 11/2012 | Tan et al. |
| 2013/0045673 A1 | 2/2013 | Tan |

(Continued)

*Primary Examiner* — Regina N Holder
(74) *Attorney, Agent, or Firm* — Brooks Kushman P.C.

(57) ABSTRACT

A method for allowing multiple audio sources to play sound through an audio speaker system is disclosed. The method includes designating a plurality of audio sources to provide audio sounds to the audio speaker system. The audio speaker system may receive an audio sound from each of the plurality of audio sources and create a playlist of received audio sounds. Creating the playlist may include ordering the received audio sounds in a sequential order and rotating between each of the plurality of audio sources. The audio speaker system may play each audio sound from the playlist via the audio speaker system.

21 Claims, 9 Drawing Sheets

(56) References Cited

U.S. PATENT DOCUMENTS

| | | | |
|---|---|---|---|
| 2013/0223635 A1* | 8/2013 | Singer | H04R 1/1041 |
| | | | 381/56 |
| 2013/0238341 A1 | 9/2013 | You | |
| 2014/0094943 A1* | 4/2014 | Bates | H04N 21/00 |
| | | | 700/94 |
| 2014/0329567 A1* | 11/2014 | Chan | H04M 1/605 |
| | | | 455/569.2 |
| 2015/0113022 A1* | 4/2015 | Martin | G06F 17/30761 |
| | | | 707/796 |

\* cited by examiner

METHODS FOR OPERATING AUDIO SPEAKER SYSTEMS

CROSS REFERENCE TO RELATED APPLICATIONS

This application claims priority to U.S. Provisional Patent Application No. 61/936,818, entitled "METHODS FOR OPERATING SPEAKER SYSTEMS", filed Feb. 6, 2014, the entire contents of which are hereby incorporated by reference for all purposes.

FIELD

The present application relates generally to systems and methods for incorporating listening-enhancing technology into audio speaker systems.

SUMMARY/BACKGROUND

Audio speaker systems utilize a number of sound-producing speaker units and include stationary, larger systems as well as smaller, more mobile systems such as headphones and earphones. Audio speaker systems share the common function of transforming electrical audio signals into sound waves via a transducer. As mobile and other forms of electronic technology are rapidly expanding, the inventors herein have recognized opportunities to update audio speaker systems to conform to the requirements of users in order to create a more enjoyable listening experience.

Current audio speaker systems may allow one or multiple users to connect via one more audio input devices. However, as the number of users wanting to hear their personal music choices increases, it may become difficult to choose which user plays a song along with the order of who determines the audio playback. The inventors herein have recognized that a speaker may be equipped with the ability to determine the audio source from a specific user, and arrange a set of songs in a playlist so each of a plurality of users is able to choose a song sequentially.

In another problem, speakers that utilize power-saving technology may be inconvenient to users that may want to immediately listen to their music upon entering a space without having to manually power on the speaker. The inventors herein propose an always-aware proximity system wherein the speaker automatically powers on upon detection of a proximity trigger, so as to allow the user to enjoy their music simply by entering a space or performing another action in accordance with the proximity trigger.

Speakers may be equipped with always-listening technology, wherein a speaker continually analyzes ambient noise and upon detection of a pre-programmed voice command, activates a corresponding function such as switching a playlist or marking a song as a favorite. In a related example, an intelligent speaker may analyze ambient noise for a volume level, wherein upon reaching a threshold volume, the speaker adjusts the sound output volume to allow users to hear the music while still able to converse with others.

Finally, an intelligent speaker may continually learn the music listening preferences of one or more users, and after a learning time period, be able to make suggestions to the user along with automatically adjusting settings such as volume and equalization according to what the user normally desires. If multiple users listen to the same speaker (or audio speaker system), the speaker may learn multiple music listening preferences and arrange them in audio profiles, each profile corresponding to a single user.

Methods and systems are provided herein that incorporate technology, including voice-activation and always-aware capabilities, into audio speaker systems to create a more enjoyable listening experience for a user. It is noted here that the following embodiments described hereafter are to be considered in a non-limiting sense. Several example methods and systems are described for carrying out the general concepts as described below, but it is understood that other example systems that are not disclosed may be possible while utilizing the same general concepts.

DETAILED DESCRIPTION

Two general approaches of listening to audio sounds (such as music) presently exist, wherein audio sounds may include music or other type of sound playback such as speeches or talk radio shows. The first approach falls under the category of audio speaker systems, wherein components such as receivers, amplifiers, audio source devices and accessories, and speakers are wired or wirelessly connected to produce sound. Audio speaker systems may be placed in indoor or outdoor settings depending on the audio requirements. A defining feature of audio speaker systems is that the speakers are placed away from a listener, such that a listener may audibly and enjoyably hear the produced sound from a distance around the one or more speakers of the audio speaker system. Another defining feature of audio speaker systems is that they are designed for multiple listeners to hear the produced sound simultaneously.

The second approach of listening to audio sounds falls under the category of wearable headphones. For this description, wearable headphones include personal audio accessories that are worn directly adjacent to the ears of a user, types of devices including on-ear, over-ear, or in-ear headphones or earphones that utilize ear buds that fit into the ear canal of a user. Wearable headphones comprise two individual speaker units that fit adjacent to or in a user's ears and the two speaker units are wired or wirelessly connected to an audio source, such as a mobile phone, computer, or other electronic device. A defining feature of wearable headphones is that they are placed directly near the ears of a user and sound is audible at small distances between the user and the wearable headphone. Another defining feature of wearable headphones is that they are designed for a single listener; sound is directed towards an individual and other people nearby generally do not clearly hear the produced sound. Related to this, due to cushions and other components meant to seal off a user's ears, wearable headphones often effectively isolate a listener from their surroundings.

The inventors herein have recognized that audio speaker systems may be limited in the number of external audio input devices that may be utilized at once, thereby limiting the music experience for a multitude of listeners. For example, one audio input device may be able to sequentially play songs through the speakers of the audio speaker system. The inventors herein propose a method for allowing a multitude of users (and multiple audio input devices) to be connected to an audio speaker system simultaneously with the ability to create music playlists with a rotating song contribution for each member. The sharing functionality with rotating song contribution may be incorporated in a multi-source playback share mode of the speaker. The share mode could be activated by a switch and be one or multiple modes. Other modes may include a mode for receiving audio input from a wired connection such as a radio receiver and a mode for receiving audio input from a wireless source. The share mode would enable multiple users to select songs and the speaker would arrange those songs in a particular order according to the order of users. As an example, if three users had devices connected to the audio speaker system, songs would rotate in sets of three, as further explained below.

Figure 1:
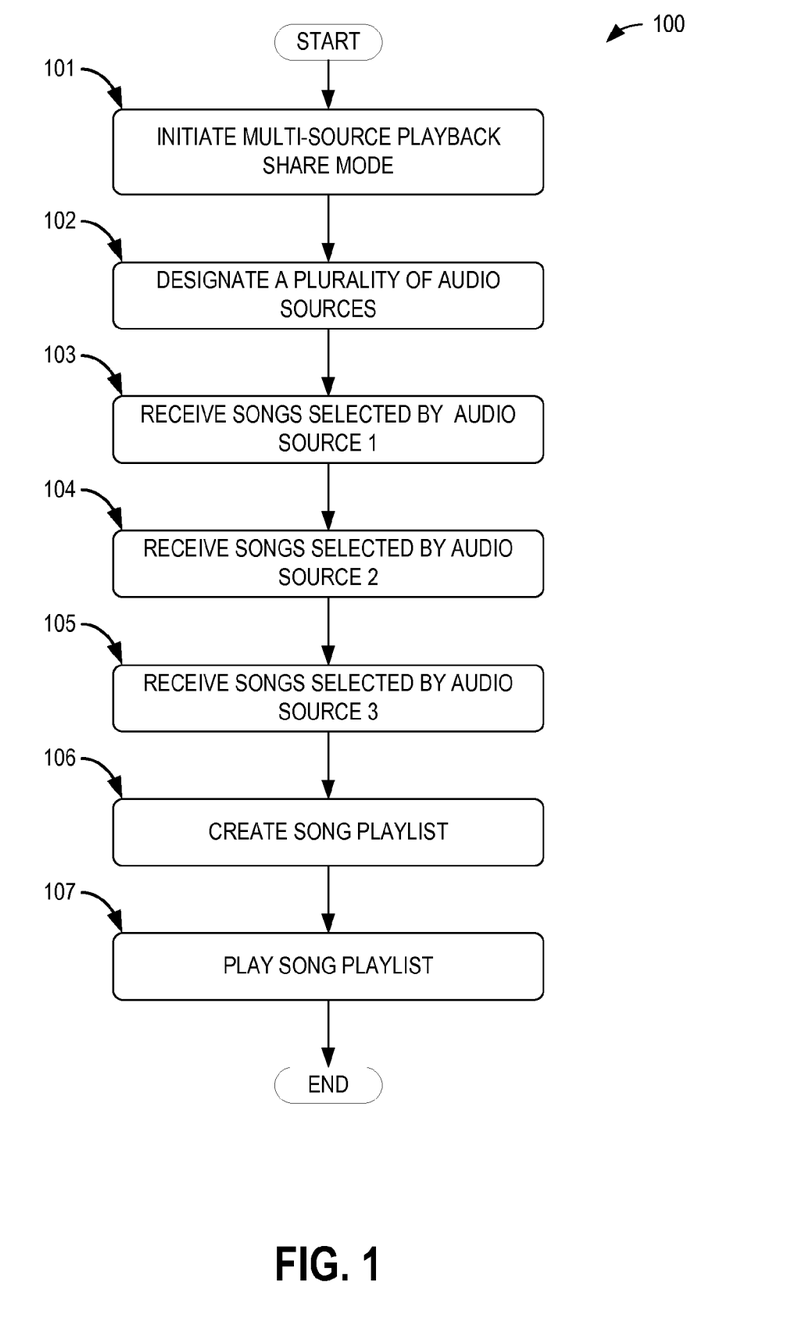
FIG. 1 shows a flow chart for choosing the playlist of an audio speaker system from multiple users.

FIG. 1 illustrates a method 100 for allowing multiple audio sources to play sound through an audio speaker system. An example flow chart of method 100 for determining a playlist for an audio speaker system with three users choosing songs. First, at 101, a multi-source playback share mode is initiated as a part of the audio speaker system, wherein any previously-operating modes are halted and the multi-source playback share mode is started. Next, at 102, the audio speaker system may designate a plurality of audio sources to provide audio sounds to the audio speaker system. In this example, a number of users (DJ's) are identified by some form of pairing between multiple external audio sources. For illustrative purposes, three DJ's are selected, although more may be chosen in other alternative embodiments. Each of the three DJ's may pair an audio source device such as an MP3 player, computing device, portable computing device, cellular phone, or any other suitable portable communications device, for example, to the audio speaker system through one of a direct wired connection, a direct wireless connection protocol such as Bluetooth, a network connection, or any other suitable data transfer method. In alternative embodiments, the multi-source playback share mode may require a login or other suitable authentication process as part of the selection of a DJ.

The audio speaker system may receive an audio sound from each of the plurality of audio sources. Thus, at 103, the speaker receives audio sounds in the form of songs selected by the first audio source (user 1). In this example, the audio speaker system may receive three songs from user 1. Similarly, at 104, the audio speaker system receive songs selected by the second audio source (user 2) while at 105 the speaker receives songs selected by the third audio source (user 3). Each of the second audio source and the third audio source may provide three songs to the audio speaker system. It is noted that each user selects songs from their respective audio source devices. The audio source devices may include a certain program of an MP3 player, a music library of a laptop computer, and a satellite radio station of a mobile phone. The multi-source playback mode would allow a wide range of sources to play music through the single speaker (or multiple speakers in the same system).

At 106, a song playlist is created wherein the users' songs are ordered sequentially and rotating between each user. In this example, the order of songs would be: user 1 song 1, user 2 song 1, user 3 song 1, user 1 song 2, user 2 song 2, and so forth forming a playlist of nine songs total. This song playlist is then played through the audio speaker system at 107. In this way, each user listens to their respective three songs while sharing the audio speaker system with each other. In some embodiments, playing each audio sound of the playlist includes sequentially connecting to an audio input signal from each audio source of the plurality of audio sources in order of the playlist. In this example, the audio speaker system may connect to an audio input signal from user 1 to play user 1 song 1. Upon completion of playing user 1 song 1, the audio speaker system may connect to the audio input signal from user 2 to play user 2 song 1. The audio speaker system may proceed sequentially through the playlist connecting to the respective audio input signal as directed by the playlist.

In alternative embodiments, the shared playlist may be dynamic, in that as the playlist is being played, the audio speaker system may continually receive audio sounds from the plurality of audio sources. Each received audio sound may be ordered within the playlist as the playlist is being played. In other words, the users may continue sequentially (or not) adding songs to the playlist without interrupting play of the playlist.

In other embodiments, the songs selected by each user may be sorted and played by genre or any other suitable metric to provide a more cohesive listening experience. For example, user 1 may select a rock song, user 2 may select an easy listening song, and user 3 may select a different rock song. In this example, the playlist may play the song selected by user 1 followed by the song selected by user 3 before playing the song selected by user 2. It will be appreciated that the multi-source playback mode may also be configured with one or more content filters. An example content filter may be configured to identify and not add selected songs to the playlist that may contain inappropriate content. Furthermore, the audio sources of each user may be different to allow for a more diverse range of audio sources and music selection.

In another example embodiment of a multi-source playback share mode, a method is provided for allowing multiple audio sources to play sound through an audio speaker system, comprising: a multitude of audio sources connecting to an audio speaker system; selecting an order of the audio sources, each audio source corresponding to a user; and sequentially receiving and playing audio sounds from each audio source while blocking audio signals from other audio sources. In this example, sequentially receiving and playing audio sounds may comprise rotating an input audio signal between each of the multitude of audio sources. Furthermore, while playing a first audio sound from a first audio source of the plurality audio sources, the audio speaker system may receive an additional audio sound from another audio source. The audio speaker system may block the additional audio sound and order the additional sound within the playlist. Blocking additional audio sounds may comprise preventing the additional audio sound from playing while a first audio sound is being played through the audio speaker system.

Mobile or stationary speakers often incorporate a power-saving function that automatically shuts off the speaker after a period of time of idling (no song output) or operates or places the speaker in a low-power state. If the speakers want to be used again, they must be manually commanded to operate in a full power state. The inventors herein have recognized that while power-saving functions enable longer battery life of battery-operated speakers and reduce overall power consumption, manually manipulating a speaker to power it on multiple times daily may be inconvenient. As such, speakers may be incorporated with an always-aware proximity system that automatically turns the speaker on in response to a proximity-based trigger. The proximity system may further consume a low amount of power and be customizable to suit a user's needs. For example, the user may choose the proximity-based trigger to be a signal strength level between the speaker and an external audio device such as a mobile phone. If the strength is above a threshold set by the user, then the speaker turns on. Additional embodiments of the speaker and related system are explained below.

Figure 2:
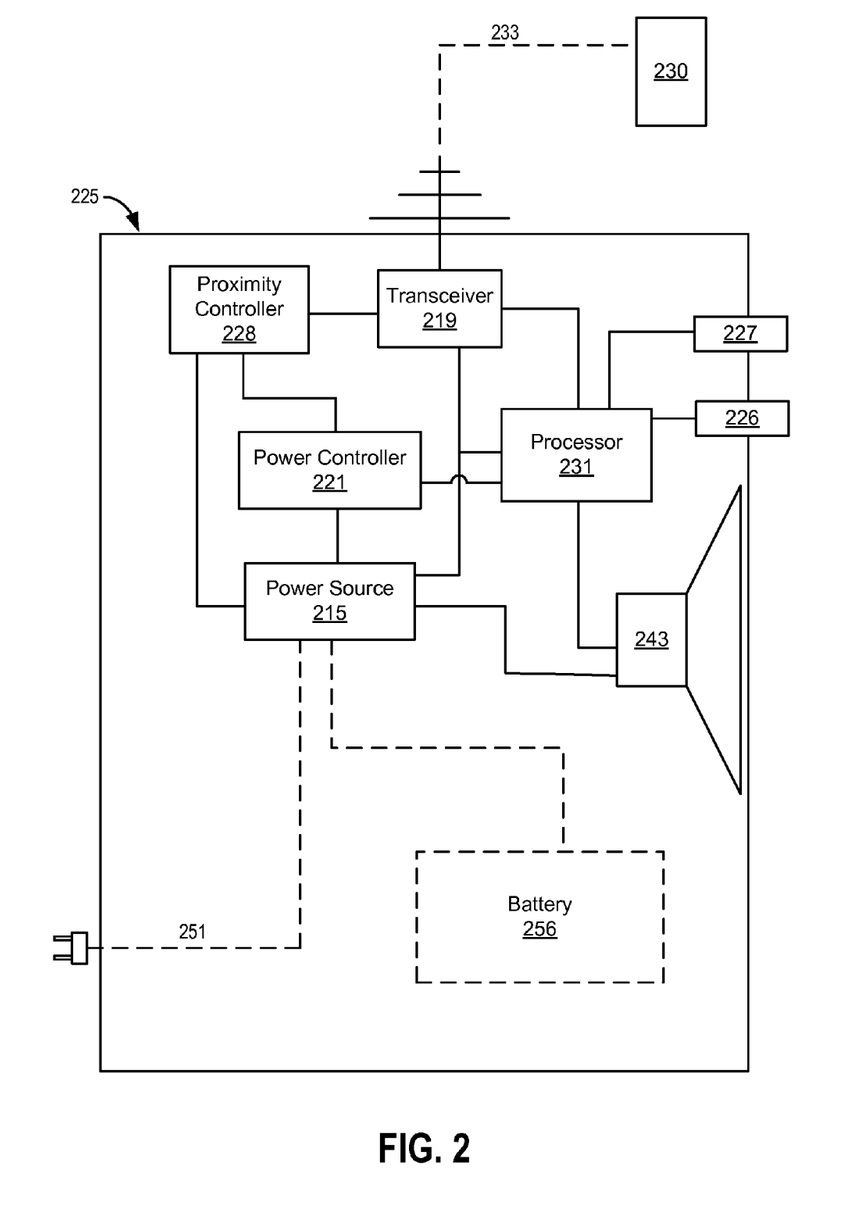
FIG. 2 shows a speaker with an always-aware proximity system for detecting distance between the speaker and an audio device.

An example speaker 225 with a power-saving function and an always-aware proximity system is shown in FIG. 2. A power source 215 may provide power to the other components that require active powering. Power source 215 may be one of several devices, such as a battery 256 contained within speaker 225 or an external outlet connected to the speaker via an electrical cable 251. A processor 231 may receive an electrical audio signal from either an input 227 or a transceiver 219, which may be configured to receiver wireless signals. Processor 231 may include logic to implement the multi-source playback share mode of FIG. 1. Input 227 may externally connect to amplifiers and/or receivers if speaker 225 is part of an audio speaker system. For cases where speaker 225 is a portable speaker, speaker 225 may be a standalone unit wherein an internal amplifier is an additional component or incorporated in processor 231. The processor provides audio signals to speaker 243 for sound output. A power controller 221 provides the power-saving function of speaker 225, wherein after a time duration of no audio playback, power controller 221 sets the speaker in a lower-power state by limiting the output of power source 215. Speaker 225 may also include an environmental awareness sensor 226. Environmental awareness sensor 226 may monitor the environment surrounding speaker 225 and provide environmental data to processor 231. For example, environmental awareness sensor 226 may include a microphone to monitor the ambient noise level of the environment, for example. In some embodiments, the environmental awareness sensor may also receive voice commands provided to the speaker by a user.

The proposed always-aware proximity system may be provided by proximity controller 228. Controller 228 contains logic for periodically checking if an external audio source 230 is within a wireless range of transceiver 219. Upon detection of an active wireless connection 233 (or pairing) between audio source 230 and transceiver 219, proximity controller 228 may communicate with power controller 221 to bring the speaker back into a full-powered state in anticipation of an incoming audio signal. In this way, a user may be able to play music as soon as their device is within range of the speaker. Alternatively, proximity controller 228 may examine input 227 for an active audio data connection in addition to transceiver 219. Note that the components shown in speaker 225 of FIG. 2 are meant for illustrative purposes, and the layout, configuration, and/or addition of other components may be changed while maintaining the general purpose of providing an always-aware proximity system with a power-saving mode.

It will be appreciated that processor 231 may be configured to execute software instructions stored upon a storage device of speaker 225. Additionally or alternatively, the processor 231 may include one or more hardware or firmware processors configured to execute hardware or firmware instructions. Processor 231 may be single-core or multi-core, and the instructions executed thereon may be configured for sequential, parallel, and/or distributed processing. Individual components of the processor optionally may be distributed among two or more separate devices, which may be remotely located and/or configured for coordinated processing, such as when speaker 225 is one speaker of an audio system.

Speaker 225 may include one or more physical storage devices including volatile, nonvolatile, dynamic, static, read/write, read-only, and/or random-access memory configured to hold machine-readable instructions executable by the processor 231 to implement the methods and processes described herein. When such methods and processes are implemented, the state of storage device may be transformed—e.g., to hold different data such as a song playlist. Speaker 225 may include removable and/or built-in devices such as semiconductor memory (e.g., RAM, EPROM, EEPROM, etc.).

It will be appreciated that aspects of the instructions described herein alternatively may be propagated by a communication medium (e.g., an electromagnetic signal, an optical signal, etc.) that is not held by a physical device for a finite duration.

Aspects of processor 231 and the storage devices of speaker 225 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Figure 3:
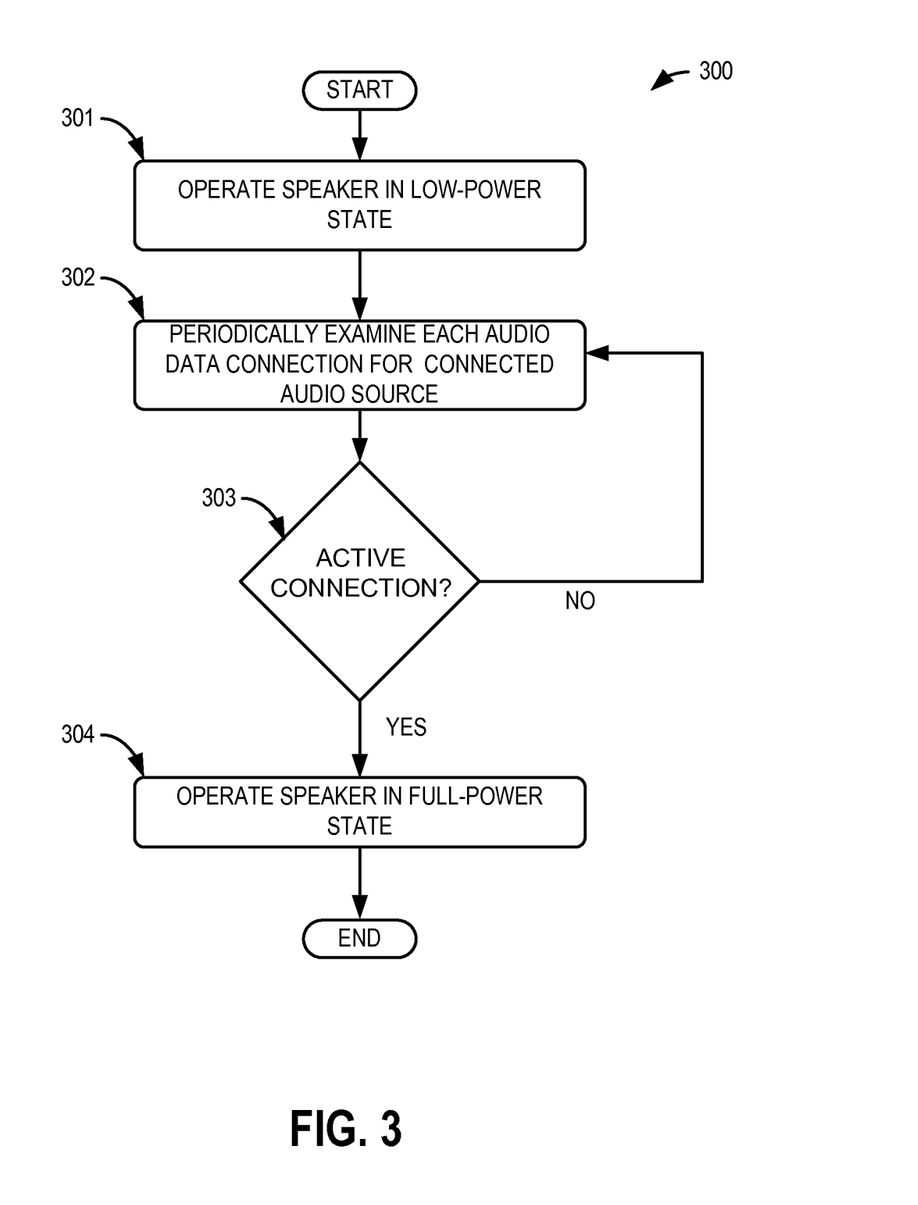
FIG. 3 shows a flow chart for operating the always-aware proximity system.

A flow chart 300 is provided in FIG. 3 showing the process of bringing speaker 225 of FIG. 2 from a low-power state to a full-power state. The low-power state may be characterized by a form of standby mode wherein the essential function of the speaker are turned off and an amount of power is required to maintain operation of the components necessary to periodically check for a wireless connection. Turning to flow chart 301, at 301 the speaker may initially operate in the low-power state. The low-power state may be activated upon expiration of a time duration wherein no audio signal is received by the speaker and/or there is no connection between the audio speaker and an external audio device (source). Next, at 302, while the audio speaker system is in the low-power state, the proximity controller periodically checks for an active audio data connection between the speaker and the external device. It will be appreciated that an active audio data connection may be via a wired, direct wireless, network, or any other suitable data connection. If an active connection to an audio source is determined at 303, then at 304 the speaker may operate in the full-power state, where it can immediately resume playback of an audio sound and/or receive an audio sound from the audio source. Conversely, if no active connection is detected, then step 302 is repeated and the speaker resumes periodic examination for an active audio data connection.

Figure 4:
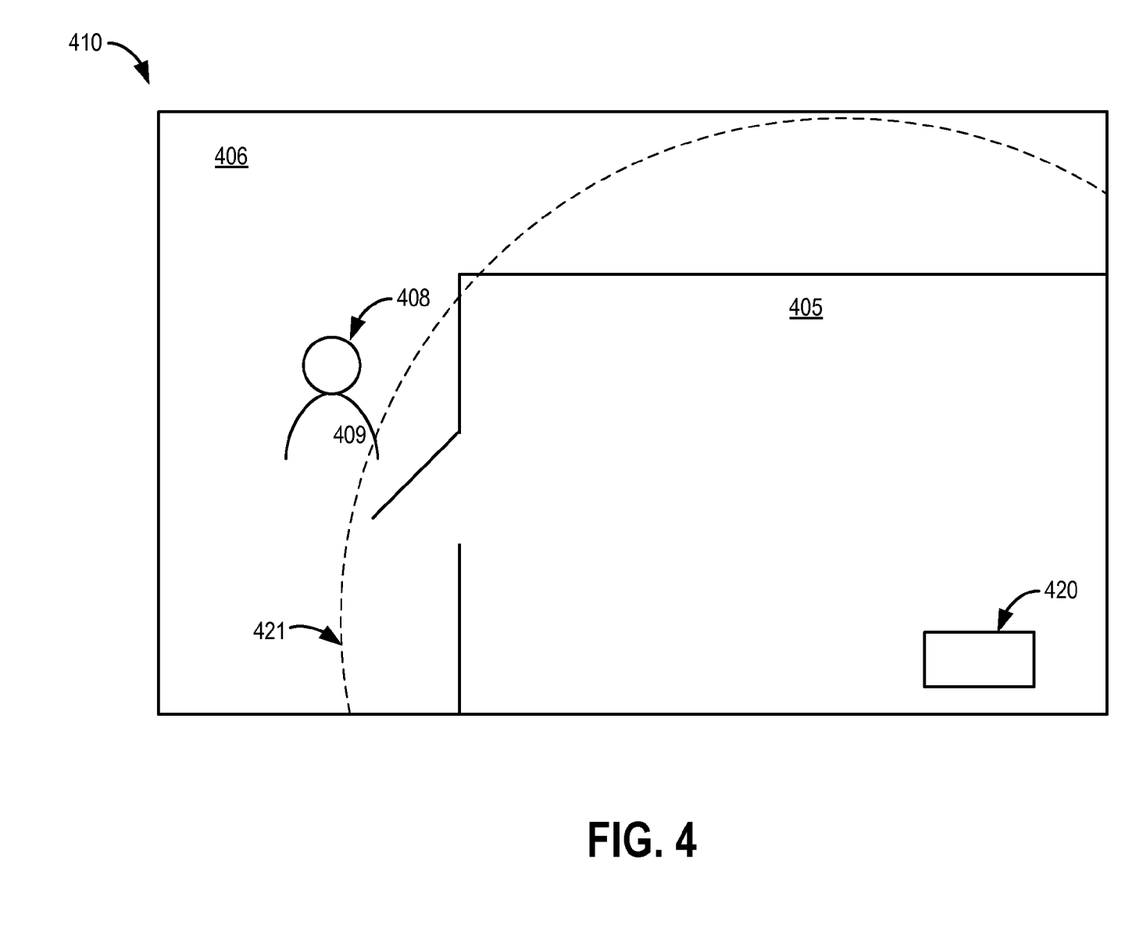
FIG. 4 depicts an environment surrounding a speaker incorporating the always-aware proximity system.

An example system is shown in FIG. 4, wherein a speaker 420 incorporating the always-aware proximity system is placed inside a room 405 of a house 410. Initially, speaker 420 is in a powered off state. A user 408 with an audio output device 409 is in another room 406 within the house. As user 408 comes near room 405 and speaker 420 as shown by proximity radius 421, a control unit of the proximity system detects the device carried by user 408 and switches speaker 420 into a powered on state. Therefore, as user 408 walks into room 405, the user may press play on their audio device 409 to start music playback from speaker 420 without having to manipulate a remote or other accessory to turn the speaker on. In this example, the audio device 409 carried by user 408 is wirelessly tethered to speaker 420, and the proximity functionality may be based on the distance between the speaker and the audio device. In alternative examples, the proximity system may include one or more remote proximity sensors that may be connected to a door such that when the door opens, the speaker is powered on, for example.

The inventors herein have recognized that there is a need for robust speakers with voice-activation capabilities as well as button-based control interfaces. In addition to voice commands to control basic speaker functions such as play, pause, skip song, and reverse, the speaker may incorporate additional, different functions. These different functions may be incorporated in a voice-activation module (with computer-readable instructions) and include switching between the playlists of a user's audio device and marking (tagging) a song as a favorite. In addition, the speaker may be connected to a network (such as the internet) so as to enable a user to share a song with a friend via voice commands. In another embodiment, the speaker may be placed in an office environment in the workplace, where a user may want to share a song with a coworker or another user. The voice activation capabilities may be tied in with an always listening function of the speaker, wherein the speaker is continually analyzing surrounding ambient noise. By always listening to ambient noise and upon detection of specific vocal commands from a user, the speaker immediately responds with the related function.

Figure 5:
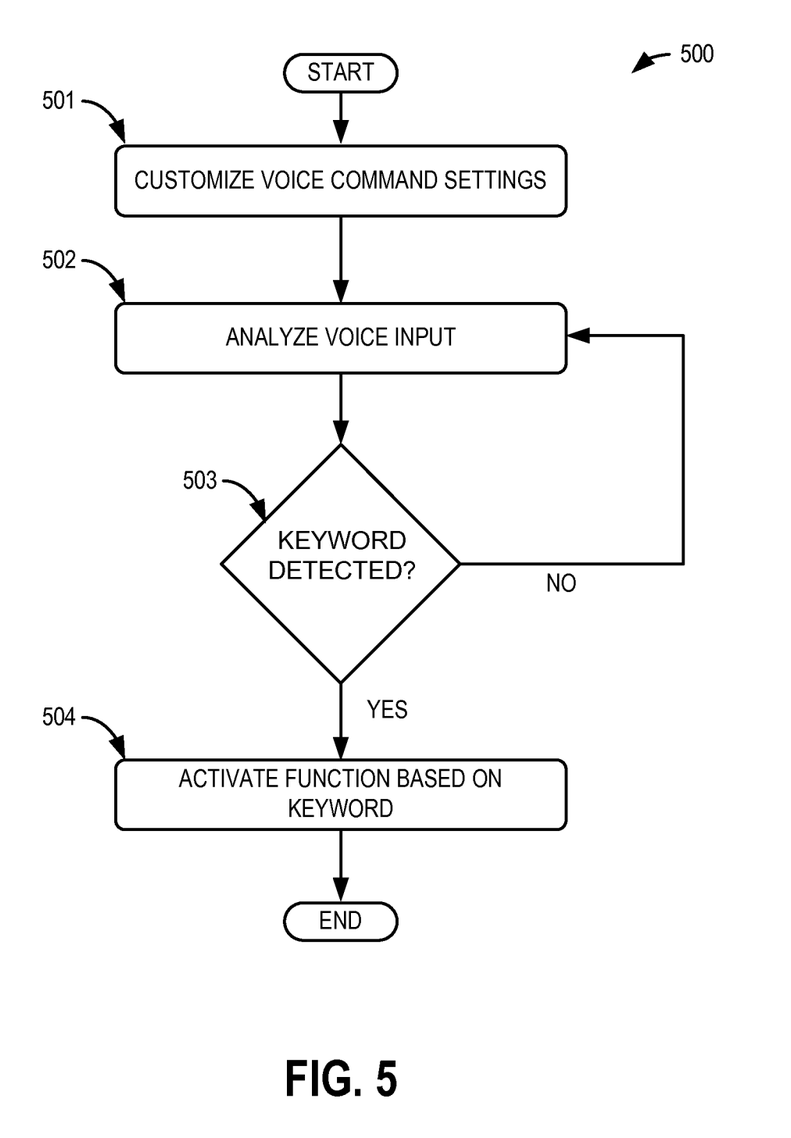
FIG. 5 shows a flow chart for a voice-activation process of a speaker.

An example flow chart 500 for voice-activation capabilities incorporated in an audio speaker system is shown in FIG. 5. First, at 501, a user may customize the voice command settings of the speaker in accordance with their preferences. For example, the user may decide which phrase or phrases for switching to a new playlist, such as 'switch to playlist 2', 'skip this playlist', or 'change playlist.' Upon customization the settings, at 502, during normal operation of the speaker, the speaker analyzes voice input in the ambient noise surrounding the speaker. The analyzing may be an always-on feature that consumes a low amount of power compared to the speaker transducer itself. At 503, if a programmed keyword (or key phrase) is detected, then at 504 the corresponding function is activated based on the keyword. Conversely, if no keyword is detected, then the speaker resumes analyzing the ambient noise at 502.

In another embodiment, a method is provided for operating an audio speaker system with voice activation capabilities, comprising: receiving audio sounds from an external audio device; identifying a command based on a vocal input from a user; generating a message based on the command; and sending the message to the external audio device. In this embodiment, the message may include instructions for executing a function. Furthermore, the function may comprise marking a song or playlist as a favorite, suggesting songs to a different user via a network of the audio device, or a combination thereof. Also, the audio device may be a mobile phone or similar device with network-connectivity capabilities.

Figure 6:
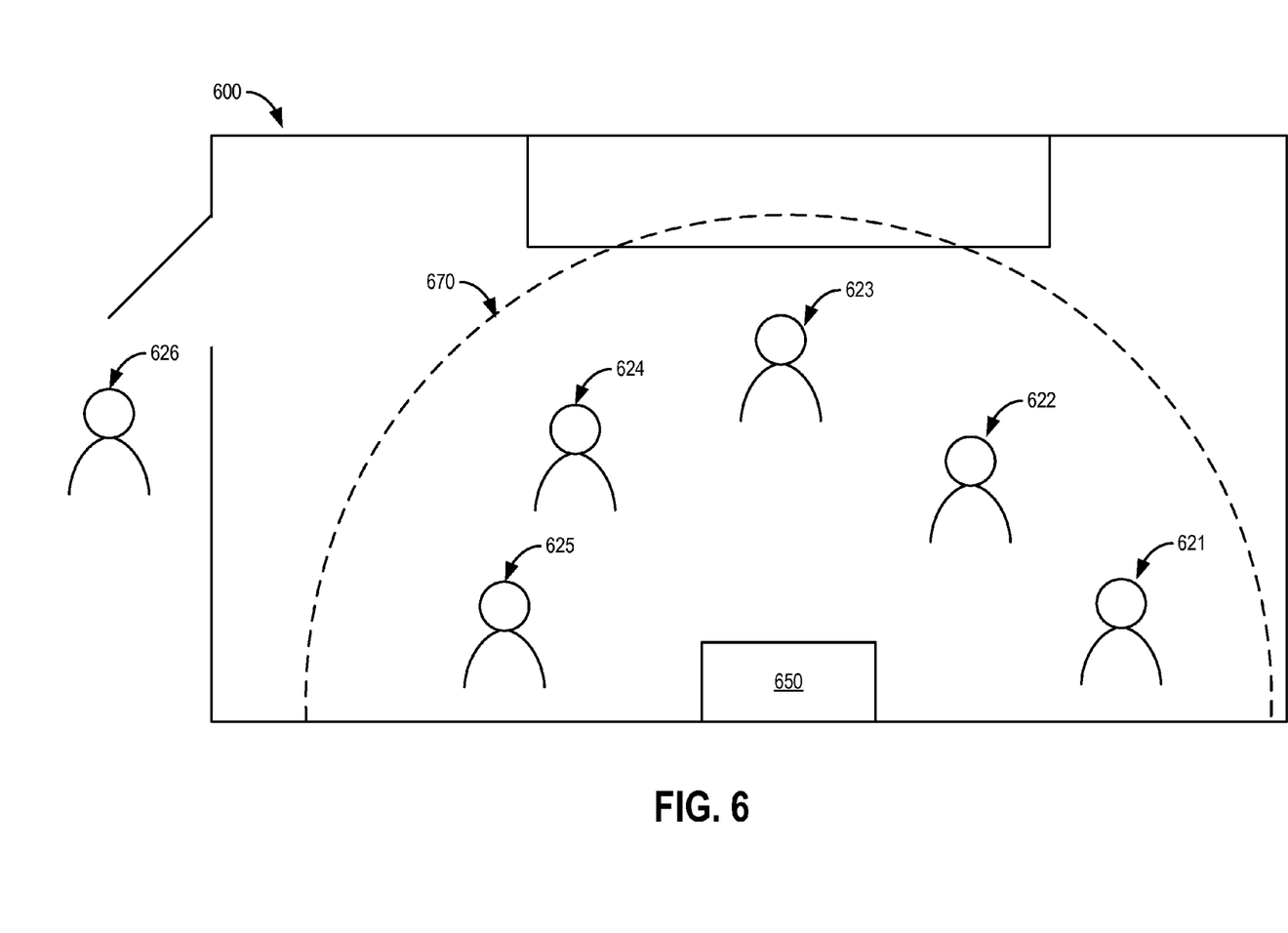
FIG. 6 shows a speaker with an environmental awareness function for detecting a volume level of ambient noise and adjusting settings accordingly.

In another speaker embodiment, the speaker is equipped with an environmental awareness function (module with computer-readable instructions) that senses the changing environment surrounding the speaker and adjusts audio playback accordingly. The speaker may be equipped with a proximity sensor, microphone, or other suitable sensor enabling the speaker to monitor environment surrounding the speaker. It will be appreciated that the sensor may be incorporated into the speaker, a remotely connected sensor, or any combination thereof. In one example shown in FIG. 6, a speaker 650 is located inside a room 600. The speaker may sense the number of people within a radius 670, or alternatively, may register the amount (volume) of ambient noise generated by the people in room 600, as the room is an enclosed, isolated space. As the number of people in the room increases, or alternatively as the ambient noise increases, the speaker continually and automatically adjusts the speaker sound volume to accommodate the number of people or noise level in the room. If a first person 621 is in the room by themselves, the speaker may adjust the volume to suit the person's hearing needs. As additional people 622, 623, 624, and 625 enter the room and/or radius 670, the speaker may adjust its volume accordingly. In one example, if five people are present in room 600 but are quiet, then speaker 650 may play normally. On the other hand, if the five people are conversing, then speaker 650 may adjusts the volume to a level where people can hear the music while still being able to hear each other. The speaker settings, such as at what level of ambient noise to adjust the speaker volume, may be customized to suit the preferences of the listeners as well as adjust to the acoustics and geometry of room 600. Through a user interface of the speaker, the user may select a number of volume thresholds for ambient noise, which are then stored in the speaker for later adjusting the sound output volume settings.

Figure 7:
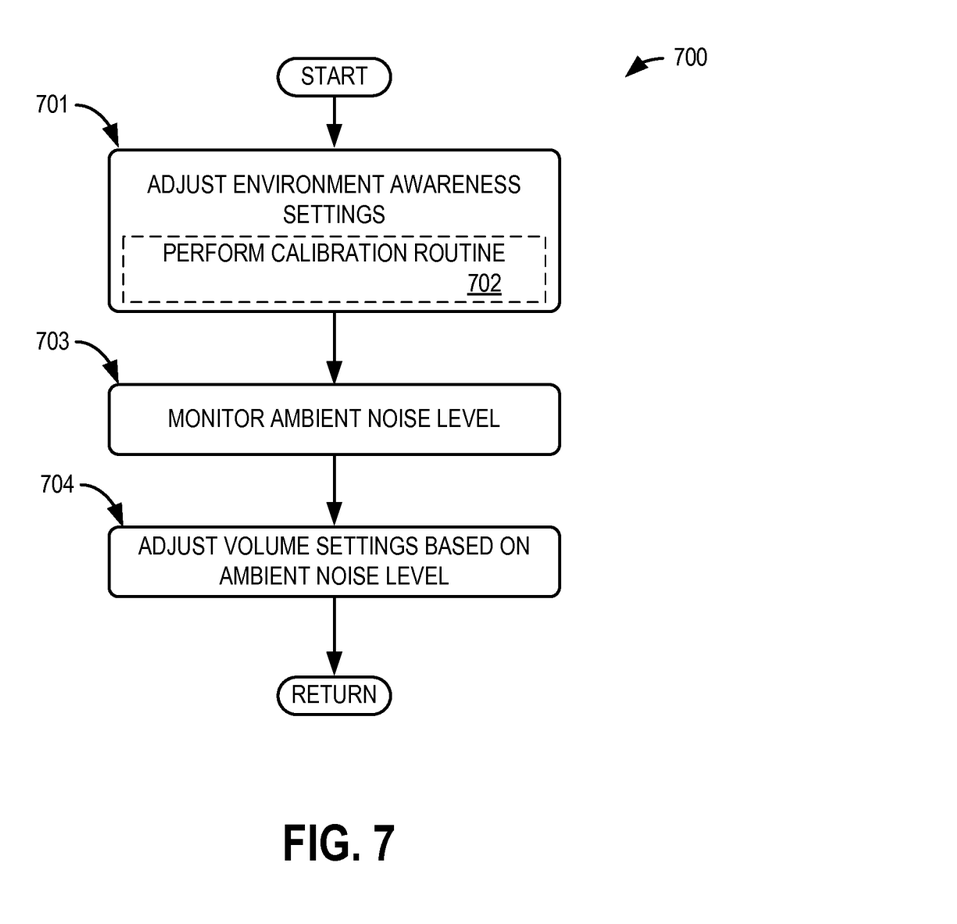
FIG. 7 shows a flow chart for the environmental awareness function of a speaker.

A flow chart 700 is shown in FIG. 7 that illustrates the process of a speaker adjusting volume based on a level of ambient noise in a room. First, at 701, a user may adjust the environment awareness settings. These settings may include threshold noise levels that cause the speaker to adjust sound output volume. Alternatively, the threshold noise levels and associated sound output volume may be provided by the manufacturer (as processor executable instructions) and/or performing a calibration routine to determine the acoustics of the room at 702. Furthermore, the responsive sound output volume may be adjusted by the user. For example, if the ambient noise reaches a volume of 12 (according to a scale of the speaker), then the speaker increases the sound output volume by 3. Next, at 703, the speaker continually analyzes the ambient noise via a sound input device such as a microphone. In response to the detected volume of ambient noise, the speaker automatically adjusts the sound output volume at 704. Additionally, the speaker may contain instructions for first determining the amount of volume increase necessary, then gradually increasing the volume to the desired level rather than abruptly increasing the volume which may cause an unpleasant listening experience.

The inventors herein have recognized that speakers may utilize the capability to automatically learn a user's music listening preferences in a more robust sense than simply adjusting volume and/or equalization settings. A more robust adaptive learning audio speaker system may include an internal clock that can differentiate between daytime and nighttime as well as distinguish between different music genres. Based on a learning period, the speaker can make musical suggestions to the user and better learn the user's preferences throughout time. In addition, the speaker may learn audio profiles for a number of different users, thereby allowing customization of listening preferences available to each individual user.

Figure 8:
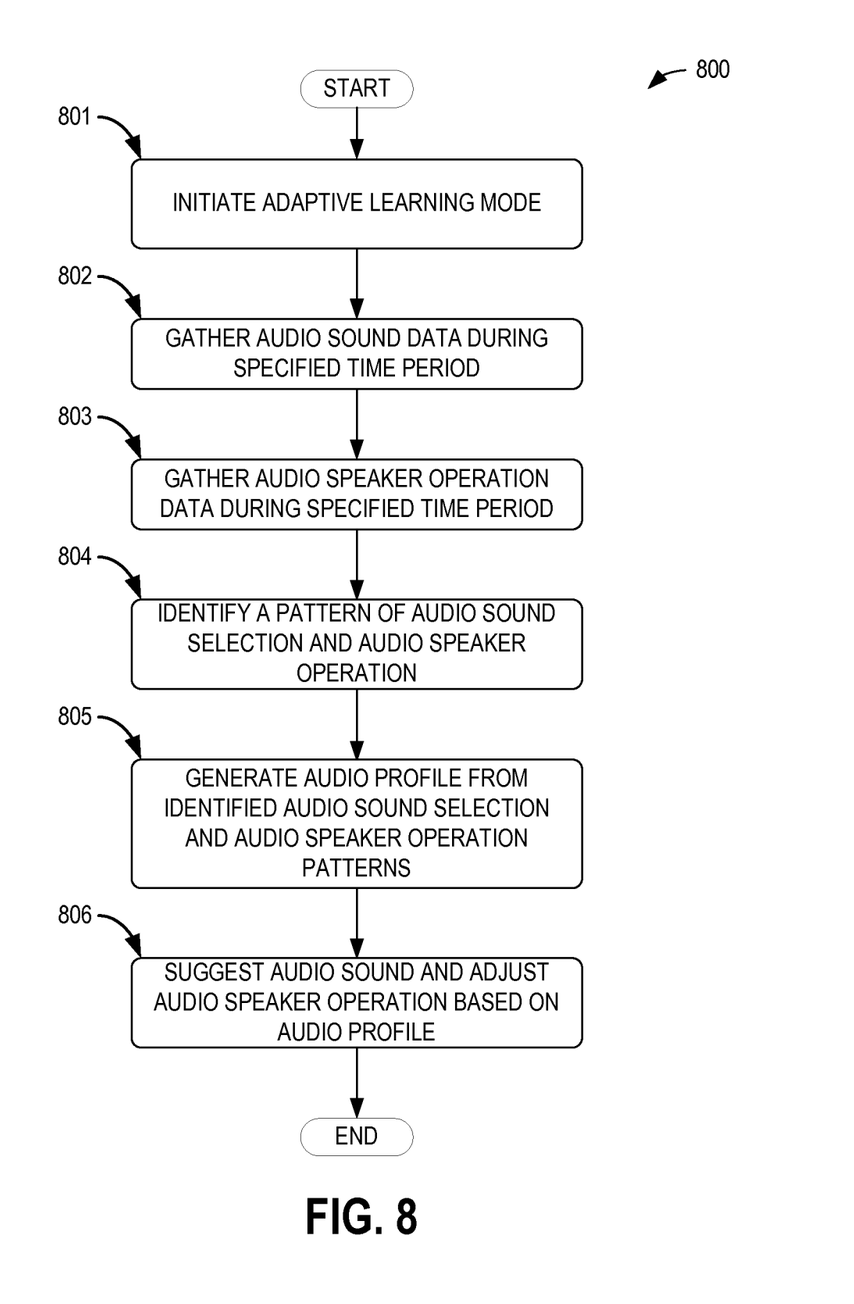
FIG. 8 shows a speaker with functionality for adaptively learning music listening preferences of one or more users.

An example flow chart 800 showing how an audio speaker system may adaptively learn a user's listening preferences is shown in FIG. 8. First, at 801, the adaptive learning mode of the audio speaker system is initiated. This step involves setting parameters such as the internal clock of the audio speaker system, number of users that utilize the audio speaker system since listening preferences may be different amongst different users, and customization of the extent to which the audio speaker system learns a user's listening preferences. Also, during this step, a period of time may be selected during which the audio speaker system only learns preferences without suggested or otherwise adjusting audio playback. For example, a user may want the audio speaker system to immediately begin suggesting songs, whereas another user may want the audio speaker system to wait for five days to learn their preferences. Next, at 802, the audio speaker system gathers song selection data during the specified time period, recording a variety of factors, including when a user listeners to specific genres during what time of day, for example. At 803, the audio speaker system may gather operation data for the audio speaker system such as the volume of their music according to genre and time, and when music is played versus when it is not played. It will be appreciated that the audio sound data and audio speaker system operation data may be gathered concurrently. For example, a user may be away at work during the afternoon, and as such, the audio speaker system could enter a low-power state mode during those hours. At 804, the audio speaker system may identify a pattern of audio sound selection and audio speaker operation from the audio sound data and audio speaker operation data. The identified patterns may be indicative of music preferences of the user. At 805, the audio speaker system may generate an audio profile based upon the identified patterns. It will be appreciated that the audio profiles may be saved to local storage or stored at a remote network location. Upon generating the audio profile, at 806, the audio speaker system may begin to suggest songs or genres or playlists to a user as well as automatically adjusting equalization and/or volume settings to conform to the user. It is noted that upon completion of process 800, the speaker continually learns and adapts to the user's music preferences, thereby continually improving the listening experience for the user. In addition, the audio speaker system may learn the differences between different users and save audio profiles for each individual user, wherein each audio profile contains listening data. As an example, a user could speak their name aloud and the audio speaker system would recognize the user's voice and/or name and select the corresponding audio profile. In a related method, first the user would select several parameters as discussed previously. Then, the audio speaker system would analyze listening preferences of the user and store those preferences in an audio profile of the user. Finally, upon elapse of a pre-set time duration, the audio speaker system begins automatically suggesting songs or otherwise manipulating audio playback. Additionally, the audio speaker system continually learns listening habits of the user and constantly changes the audio profile according to the changing preferences of the user.

In another embodiment, a method is provided for an audio speaker system learning the listening preferences of multiple users, comprising: connecting a multitude of audio devices corresponding to the multiple users to the speaker; gathering audio sound selection data from each audio device; and suggesting songs to the multiple users and automatically adjusting audio speaker system settings based on the audio profiles generated from the gathered data. In this embodiment, gathering audio sound data may include storing music genre, artists, albums, a date and time of playing of the audio sound and/or other listening data, and associating the data with each audio source.

In another embodiment, an audio speaker system may include the combined functionality of the speakers systems (and speakers) as described with regard to FIGS. 1-8. In this embodiment, the audio speaker system includes a multi-source playback share mode, an always-aware proximity system, voice-activation capabilities, an environmental awareness function, and a system for generating audio profiles for one or more users based on their music listening preferences. This audio speaker system includes the computing processors and additional components necessary to carry out the aforementioned functions. For example, a controller and wireless interface may be incorporated in the system in order to provide the proximity system. The combination of the above features creates an intelligent audio speaker system that may be more conducive to a user's listening needs.

Advantages and disadvantages exist for audio speaker systems and wearable headphones. For example, audio speaker systems allow an individual or a multitude of listeners to enjoy an audio experience while not being isolated from each other. However, if music is being played, everyone in the vicinity must listen to one individual's musical taste. Wearable headphones, on the other hand, provide an individual with their preferred music experience, but they become isolated from their environment and may not be social or aware of their surroundings. Furthermore, prolonged use of wearable headphones may be uncomfortable to users, particularly in-ear headphones that utilize ear buds or other accessories. Audio speaker systems do not require the user to carry or wear accessories in order to enjoy their audio experience.

The inventors herein have recognized opportunities for providing the advantages of both audio speaker systems and wearable headphones without being restricted to the disadvantages of both general approaches of listening to audio sounds. These opportunities include a personal audio immersive music experience that is delivered by one or more speakers, wherein the audio sounds are provided for a single user while the speaker units themselves are positioned away from a user (not adjacent to the user's ears). As such, the one or more speakers would direct a user's musical preferences only to them (not to other nearby persons) while simultaneously not isolating the user from their surrounding environment. In this sense, not isolating the user from their surrounding environment may involve allowing the user to hear noise from the surrounding environment.

Figure 9A:
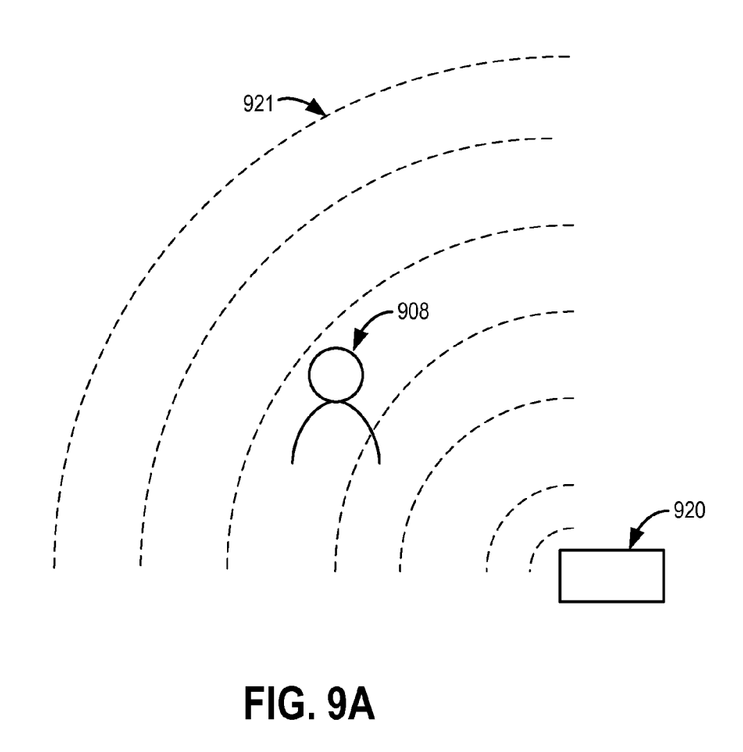
FIG. 9A illustrates a first mode of audio speaker system operation in accordance with an embodiment of the present disclosure.
Figure 9B:
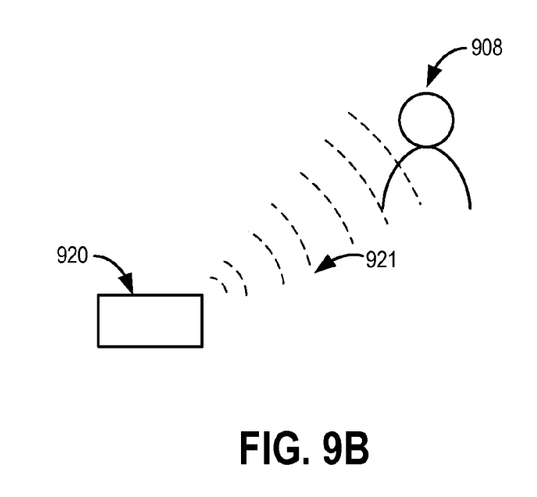
FIG. 9B illustrates a second mode of audio speaker system operation in accordance with an embodiment of the present disclosure.

FIG. 9A illustrates a first mode of audio speaker system operation where a speaker 920 emits sounds shown as sound waves 921 that may be perceived by a listener 908 and any other people within the area encompassed by sound waves 921. FIG. 9B illustrates a second mode of audio speaker system operation where speaker 920 emits sound waves 921 targeted to a single listener 908. In this second mode of operation, sound waves 921 may be perceived only by listener 908. It will be appreciated that the targeted emission of sound waves 921 may be enabled by adaptive beam forming or any other suitable technique of targeted sound wave emission. In embodiments where the speaker is one of a plurality of speakers in an audio speaker system, the audio speaker system may adjust the operation of each speaker to provide to a single listener. The audio speaker system may be configured such that the one or more audio speakers are located away from a listener and not adjacent to ears of the listener. The audio speaker system may target the sound waves emitted from the one or more speakers producing sound audible by only the listener and not to one or more surrounding persons. Furthermore, the audio speaker system may emit sounds such that the listener hears sounds produced by the one or more speakers while simultaneously not isolating the user from noise of a surrounding environment.

In a first embodiment, an indoor environment is the setting for the immersive audio experience. The indoor environment may include, but is not limited to, a work office or a common room inside a home. In this type of indoor environment, a user may want to listen to audio sounds without infringing on others' auditory experiences while simultaneously maintaining the ability to communicate with others and not be isolated from their surroundings. This same type of setting may apply to outdoor environments as well.

In a second embodiment, a mobile environment is the setting for the immersive audio experience. The mobile environment may include, but is not limited to, a vehicle, public transportation, or traveling on foot from one place to another. In this type of mobile environment, a user may have the desire to listen to personal audio sounds without forcing others to listen to the same sounds. At the same time, the user may not want to be isolated from their environment in case of a dangerous or other situation where their auditory senses are needed for reacting to the situation.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for allowing multiple audio sources from multiple users to play sound through an audio speaker system, comprising:
    designating a plurality of audio sources to provide audio sounds from a plurality of specified users to the audio speaker system;
    receiving an audio sound from each of the plurality of audio sources;
    determining each of the plurality of specified users based on one of the plurality of audio sources;
    arranging the received audio sounds from the plurality of audio sources in a sequential order so that the sequential order includes an audio sound associated with each of the plurality of specified users and rotating between each of the plurality of audio sources based on the sequential order to create a playlist; and
    playing each audio sound from the playlist via the audio speaker system.

2. The method of claim 1, wherein audio sounds are continually received from the plurality of audio sources and ordered within the playlist as the playlist is being played without interrupting playing of the playlist.

3. The method of claim 1, further comprising:
    playing a first audio sound from the first audio source of the plurality of audio sources;
    receiving an additional audio sound from another audio source of the plurality of audio sources;
    blocking the additional audio sound; and
    ordering the additional audio sound in the playlist.

4. The method of claim 1, further comprising:
    gathering audio sound data from each received audio sound from an audio source of the plurality of audio sources;
    gathering audio speaker operational data;
    identifying a pattern of audio sound selection from the audio sound data and a pattern of audio speaker operation from the audio speaker operational data;
    generating an audio profile from the pattern of audio sound selection and the pattern of audio speaker operation;
    suggesting an audio sound from the audio source based on the audio profile; and
    adjusting audio speaker operation based on the audio profile.

5. The method of claim 4, wherein audio sound data includes one or more of a title, an artist, a music genre, a date and time of playing of the audio sound, and an identification of the audio source.

6. The method of claim 4, wherein generating an audio profile includes associating audio sound data for a received audio sound with audio speaker operational data during playing of the audio sound.

7. An audio speaker system, comprising:
    an audio speaker;
    one or more audio data connections;
    one or more environmental sensors;
    a processor; and
    a storage device holding instructions executable by the processor to:

designate a plurality of audio sources to provide audio sounds from a plurality of specified users to the audio speaker system;

receive an audio sound from each of the plurality of audio sources;

determine each of the plurality of specified users based on one of the plurality of audio sources;

arranging the received audio sounds from the plurality of audio sources in a sequential order so that the sequential order includes an audio sound associated with each of the plurality of specified users and rotating between each of the plurality of audio sources based on the sequential order to create a playlist; and play each audio sound from the playlist via the audio speaker.

8. The audio speaker system of claim 7, wherein the one or more audio data connections includes one of a wireless data connection, a wired data connection, and a network connection.

9. The audio speaker system of claim 7, further comprising instructions executable by the processor to continually receive audio sounds from the plurality of audio sources and order each audio sound within the playlist as the playlist is being played without interrupting the playing of the playlist.

10. The audio speaker system of claim 7, further comprising instructions executable by the processor to:

play a first audio sound from the first audio source of the plurality of audio sources;

receive an additional audio sound from another audio source of the plurality of audio sources;

block the additional audio sound; and order the additional audio sound in the playlist.

11. The audio speaker system of claim 7, further comprising instructions executable by the processor to:

gather audio sound data from each received audio sound from an audio source of the plurality of audio sources;

gather audio speaker operational data;

identify a pattern of audio sound selection from the audio sound data and a pattern of audio speaker operation from the audio speaker operational data;

generate an audio profile from the pattern of audio sound selection and the pattern of audio speaker operation;

suggest an audio sound from the audio source based on the audio profile; and adjust audio speaker operation based on the audio profile.

12. The audio speaker system of claim 11, wherein audio sound data includes one or more of a title, an artist, a music genre, a date and time of playing of the audio sound, and an identification of the audio source.

13. The audio speaker system of claim 11, wherein generating an audio profile includes associating audio sound data for a received audio sound with audio speaker operational data during playing of the audio sound.

14. The audio speaker system of claim 7, further comprising instructions to:

receive environmental data from the one or more environmental sensors, the environmental data indicating a level of ambient noise; and adjusting a volume of the audio speaker based upon the environmental data.

15. The audio speaker system of claim 7, further comprising instructions executable by the processor to:

operate the audio speaker system in a low power state;

periodically examine each of the one or more audio data connections for an active connection of an audio source; and upon detection of the active connection of the audio source, operate the audio speaker system in a full power state.

16. The audio speaker system of claim 7, further comprising instructions executable by the processor to, upon connection of the audio source, automatically receive an audio sound from the audio source.

17. The audio speaker system of claim 7, further comprising instructions executable by the processor to:

receive environmental data from the one or more environmental sensors;

detect a keyword or key phrase within the environmental data, the keyword or key phrase indicating a voice command; and upon detection of a keyword or a key phrase, activating one or more operations associated with the detected keyword or key phrase including one of pausing a playback of an audio sound, resuming the playback of audio playback, switching between audio sounds, and marking an audio sound as a favorite via a tag stored in the memory.

18. The audio system of claim 7, further comprising instructions executable by the processor to:

generate audio sounds with the speaker such that, with the audio speaker located away from a user and not adjacent to ears of a listener, the audio sounds are audible by only the user and not to one or more surrounding persons; and wherein the audio sounds do not isolate the listener from noise of a surrounding environment.

19. A method for allowing multiple audio sources from multiple users to play sound through an audio speaker system, comprising:

designating a plurality of audio sources to provide audio sounds from a plurality of specified users to the audio speaker system;

receiving an audio sound from each of the plurality of audio sources;

determining each of the plurality of specified users based on one of the plurality of audio sources;

arranging the received audio sounds from the plurality of audio sources in a sequential order so that the sequential order includes an audio sound associated with each of the plurality of specified users and rotating between each of the plurality of audio sources based on the sequential order to create a playlist; and playing each audio sound from the playlist via the audio speaker system, wherein playing each audio sound of the playlist comprises sequentially connecting to an audio input signal from each of the plurality of audio sources of the plurality of audio sources in order of the playlist.

20. The method of claim 19, wherein each audio sound from each of the plurality of audio sources includes a music genre and the sequential order is based on the music genre of each audio sound from each of the plurality of audio sources.

21. The method of claim 19, wherein the sequential order is sequenced such that it includes at least one audio sound from each of the plurality of specified users before including a second audio sound from one of the plurality of specified users.

* * * * *